United States Patent [19]

Aoki et al.

[11] Patent Number: 4,805,472
[45] Date of Patent: Feb. 21, 1989

[54] ROTARY TORQUE TRANSMISSION APPARATUS FOR FOUR-WHEEL DRIVE VEHICLES

[75] Inventors: Kongoh Aoki, Toyota; Junichi Kano, Kariya, both of Japan

[73] Assignee: Aisin Seiki Kabushiki Kaisha, Kariya, Japan

[21] Appl. No.: 102,437

[22] Filed: Sep. 29, 1987

[30] Foreign Application Priority Data

Sep. 30, 1986 [JP] Japan ................................ 61-229542
Sep. 30, 1986 [JP] Japan ........................... 61-148691[U]
Sep. 30, 1986 [JP] Japan ........................... 61-148692[U]
Sep. 30, 1986 [JP] Japan ........................... 61-148693[U]

[51] Int. Cl.$^4$ ....................... B60K 20/16; B60K 23/08
[52] U.S. Cl. ..................................... 74/335; 74/89.14; 74/473 R; 180/247; 192/142 R; 192/143
[58] Field of Search ................... 74/89.14, 335, 473 R; 180/247; 192/142 R, 143

[56] References Cited

U.S. PATENT DOCUMENTS

| | | | |
|---|---|---|---|
| 3,132,531 | 5/1964 | Boughner | 74/335 |
| 4,550,625 | 11/1985 | Martin et al. | 74/335 |
| 4,567,969 | 2/1986 | Makita | 74/335 X |
| 4,619,151 | 10/1986 | Trachman et al. | 74/335 |
| 4,664,217 | 5/1987 | Welch et al. | 180/247 |

FOREIGN PATENT DOCUMENTS

60-163120 10/1985 Japan .

*Primary Examiner*—Allan D. Hermann
*Attorney, Agent, or Firm*—Burns, Doane, Swecker & Mathis

[57] ABSTRACT

A rotary torque transmission apparatus for a 4-wheel drive vehicle in which a rotary torque of a worm wheel of 4-wheel drive vehicle provided with a reciprocably movable fork shaft, to which a shaft fork for moving a 2-4 wheel change over slider to and fro is fixed, is transmitted to an output shaft via a torsion spring, wherein the worm wheel driven by a motor is disposed on an output shaft supported by a casing so as to be rotatable relative to the output shaft; and a pair of rotary plates so arranged as to be rotatable together with the worm wheel is disposed inside the torsion spring arranged between a pair of fixed plates fixed to the output shaft in such a way that each end of the torsion spring is retained between one rotary plate and one fixed plate disposed on the opposing side to each other, respectively.

15 Claims, 6 Drawing Sheets

ROTARY TORQUE TRANSMISSION APPARATUS FOR FOUR-WHEEL DRIVE VEHICLES

BACKGROUND OF THE INVENTION

The present invention relates to a rotary torque transmission apparatus for four-wheel drive vehicles, usable as a 2-4 wheel drive change over apparatus for a 4-wheel drive vehicle, and more specifically to a 2-4 drive change over apparatus for a 4-wheel drive vehicle, usable as a gear shift device for automotive vehicle such that 2 wheel drive can be changed over from 2 to 4 wheel drive or vice versa, or a differential lock mechanism provided for a differential gear disposed between wheels can be shifted from a lock status to an unlock status or vice versa in a 4-wheel drive vehicle. Further, the present invention relates to a 2-4 wheel drive change over apparatus provided with a cam switch.

Figure 9:
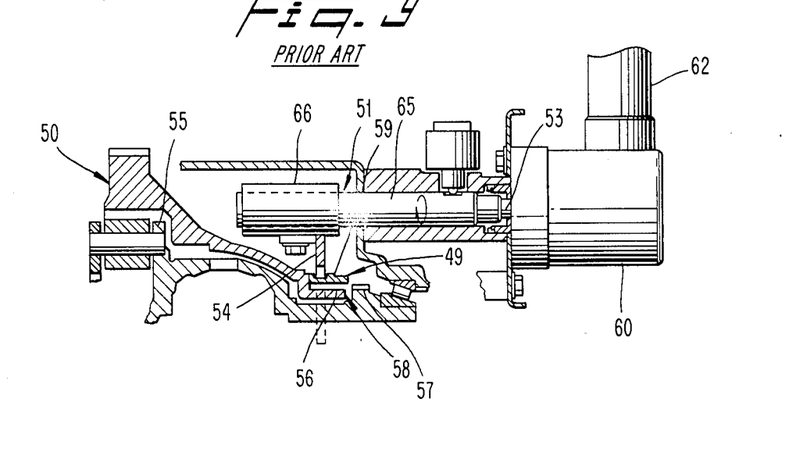
FIG. 9 is a plane cross-sectional view showing a prior-art 2–4 wheel drive change over apparatus.
Figure 10:
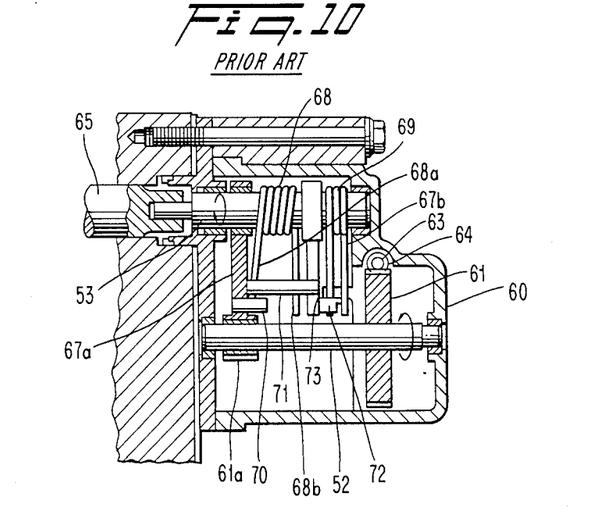
FIG. 10 is an enlarged front cross-sectional view showing the essential portion in FIG. 9.

A prior-art 2-4 drive wheel change over apparatus for 4-wheel drive vehicles disclosed in JP Utility Model Kokai Publication No. 60-163120 will be briefly described with reference to FIGS. 9 and 10. The numeral 50 denotes a between-wheel differential gear. The numeral 51 denotes a gear shift device of a differential lock mechanism 49 composed of an input shaft 52, an output shaft disposed in parallel with the input shaft 52, a shift fork 54 for converting the rotation of the output shaft 53 into the axial direction thereof and transmitting the axial movement of the shaft 53, and a slider 59 disposed at a gear engagement portion 58 including splines 56 and 57 of a power train (made up of a ring gear and a pinion carrier 55) of the differential gear, so as to be slidably driven by a shift fork 54.

The input and output shafts 52 and 53 are rotatably supported by a casing 60 at both ends thereof. A worm wheel 61 and a gear 61a are fixed to the input shaft 52. The worm wheel 61 is in mesh with a worm gear 64 fixed to the output shaft 63 of a motor 62 mounted on one-side of the casing 60. A gear 61a fixed to the input shaft 52 is in mesh with teeth formed on a circular arc-shaped end surface of a rotary plate 67a rotatably supported by the output shaft 53.

An end of the output shaft 53 is coupled with a shift rod 65 so as to be rotatable together, while an end of the shift rod 65 is coupled via a helical spline with a cylindrical member 66 on which a shift fork 54 is mounted. Therefore, when the shift rod 65 rotates in the forward or reverse direction, the cylindrical member 66 and the shaft fork 54 are moved to and fro to reciprocably drive the slider 59.

The reference numeral 67b denotes another rotary plate fixed to the output shaft 53 opposite the rotary plate 67a. The numeral 68 denotes a coil spring wound around the output shaft 53 between the two rotary plates 67a and 67b. Another coil spring 69 is wound around the output shaft 53 between the rotary plate 67b and the wall surface of the casing 60. A pin 70 and another long pin (not shown) are provided for the rotary plate 67a so as to support the coil spring 68. In other words, one arm 68a of the coil spring 68 is in contact with the pin 70, and the other arm 68b thereof is in contact with the long pin. On the other hand, one arm 68a of the coil spring 68 is in contact with a pin 71 of the rotary plate 67, and the other arm 68 thereof is in contact with the pin (not shown) of the rotary body 67b. Further, one arm of the coil spring 69 is in mesh with a pin 72 of the rotary body 67b, and the other arm thereof is in mesh with a pin 73 provided for the casing 60.

Figure 7:
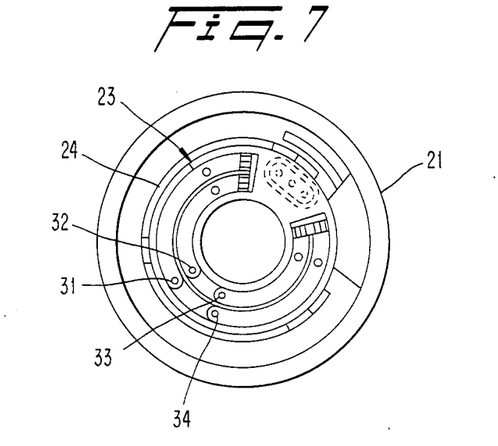
FIG. 7 is a front view showing the cam switch shown in FIG. 2.
Figure 8:
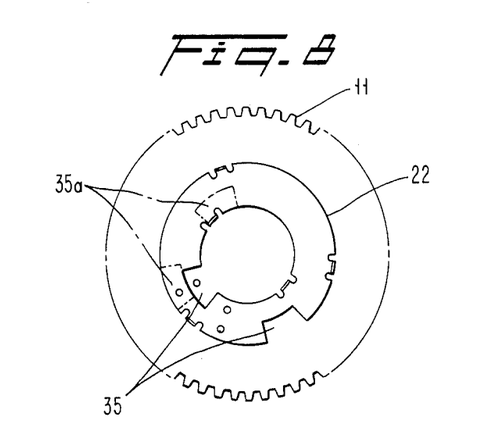
FIG. 8 is a front view showing the contact plate shown in FIG. 2.

Under the condition that the slider 59 is engaged with the spline 56 as shown in FIG. 7, when the output shaft 63 of the motor 62 and the worm gear 64 are rotated counterclockwise, the input shaft 52 is driven via the worm wheel 61 in the arrow direction in FIG. 8. Therefore, the rotary plate 67a in mesh with the gear 61a is rotated clockwise, and one arm 68a of the coil spring 68 is urged via the pin 70 clockwise, so that the output shaft is rotated clockwise.

When the coil spring 68 rotates clockwise, the other arm 58b urges the pin (not shown) of the rotary plae 67b in the same direction to rotate the rotary plate 67b and the output shaft 53 clockwise, so that the shift rod 65 is rotated clockwise (in the arrow direction in FIG. 7). When the shift rod 65 rotates in the arrow direction, this rotational movement converts the movement of the cylindrical member 66 into a straight movement via a helical spline to move the shift fork 54 in the rightward direction. Therefore, the slider 59 is engaged with the splines 56 and 57, so that a ring gear (not shown) and the pinion carrier 55 of the between-wheel differential gear 50 are engaged with each other into a lock status in the differential lock mechanism 49.

In the prior-art 2-4 wheel drive change over apparatus, however, since both ends of the coil spring 68 are bent outwardly and further the spring 68 is provided inside the two rotary plates 67a and 67b provided with the pins in contact with both the ends thereof, there exists a problem in that the spring constant of the spring inevitably increases (if the spring size is the same) and therefore it is difficult to determine a necessary torque.

Further, in the prior-art 2-4 wheel drive change over apparatus, since the coil spring 68 is directly wound around the output shaft, when a rotational power is charged by the rotation of the coil spring (torsion spring) beyond 90 degrees, there exists a problem such that the spring is deformed permanently in shape, thus degrading the efficiency markedly.

Further, in the prior-art 2-4 wheel drive change over apparatus, since the coil spring 68 is wound around the output shaft 53 and one arm 68a is in contact with the pin 70 of the rotary plate 67a to obtain an output power from the coil spring, there exist various problems such that a large output is required to change over the apparatus; it is difficult to determine the spring (constant); two coil springs 68 and 69 or a large coil spring is required.

Further, with respect to the prior art 2-4 wheel drive change over apparatus, although there has been proposed one such that a cam switch for detecting the angular position of the worm wheel is provide at the lower part of the worm wheel which applies a rotational torque to the torsion spring, no cam switch covering member is provided.

Since no covering member is provided for the cam switch provided at the lower part of the worm wheel, a rotational force is applied to the worm wheel and grease is applied to the worm gear driven at a high speed by a motor. Therefore, grease is scattered away and stuck onto the cam switch, resulting in another problem such that the change over contact operation is not reliable.

SUMMARY OF THE DISCLOSURE

With these problems in mind therefore, it is an object of the first to third aspects of the present invention to provide a novel 2-4 wheel drive change over apparatus which can eliminate the above-mentioned prior-art drawbacks relating to the spring.

Further, it is another object of the fourth aspect of the present invention to provide a novel 2-4 wheel drive change over apparatus which can further solve the above-mentioned problems related to the cam switch.

The other objects of the present invention will be clarified on the basis of the entire disclosure of the specification.

The first aspect solves the afore-mentioned problems by disposing the rotary plate inside the torsion spring. In the present invention, therefore, in a rotary torque transmitting apparatus for a 4-wheel drive vehicle in which a rotary torque of a worm wheel of a 4-wheel drive vehicle provide with a reciprocably movable fork shaft, to which a shift fork for moving a 2-4 wheel change over slider to and fro is fixed, can be transmitted to an output shaft via a torsion spring, the worm wheel driven by a motor is provided on the output shaft supported by a casing so as to be rotatable relative to an output shaft, and a pair of rotary plates so arranged as to be rotatable together with the worm wheel is disposed inside the torsion spring arranged between a pair of fixed plates fixed to the output shaft in such a way that each ends thereof is retained between the rotary plate and the fixed plate (thus brought into contact therewith). The afore-mentioned problems are solved by the above features.

When the worm wheel is rotated clockwise, for instance, the rotational torque is transmitted from one end of the rotary plate to the other end thereof. When rotated counterclockwise, a rotational torque is transmitted from the other end of the rotary plate to said one end thereof. Further, in case where the fork shaft is inoperative (e.g., disengageability of the change over spline tooth due to out-of-synchronization), only the rotary plate rotates; the motor stops soon; and the torsion spring is kept urged between the rotary plate and the plate.

Thereafter, when the fork shaft is operative, the output shaft rotates by the urging force of the torsion spring, so that the fork shaft is operated via a reduction gear mechanism.

According to the first aspect of the present invention, since the rotary plate is disposed between the plates fixed to the output shafts and within the torsion spring, it is possible to determine the spring constant of the spring small (when the size is the same) and therefore a necessary torque can be preset easily.

According to the second aspect of the present invention, the above-mentioned problems related to the spring can be solved by providing a guide mechanism. That is, according to the present invention, in a 2-4 wheel drive change over apparatus for a 4-wheel drive vehicle provided with a reciprocably movable fork shaft, to which a shift fork for moving a 2-4 wheel change over slider to and fro is fixed, the apparatus is characterized in that two-divided spring guides are disposed between a pair of rotary plates rotatable together with a worm wheel driven by a motor so as to be mutually rotatable relative to each other on a coupling sleeve of the rotary plates; and a diameter of the spring guide is determined to be substantially equal to an inner diameter of each first turn of both ends of the torsion spring provided between the rotary plates. The afore-mentioned problems can be solved by the above features.

When the rotary plate is rotated counterclockwise, for instance, the first turn of one side of the torsion spring is wound and fixed to the same side of the spring guide, and the guide is rotated by a torsional force of the coil spring. Thereafter, when the rotary plate is rotated clockwise, the first turn of the other side of the coil spring is wound and fixed to the same side of the coil spring, and the guide is rotated by the torsional force of the coil spring, thus the deformation of the coil spring being prevented in torsion.

According to the second aspect of the present invention, since the outer diameter of the 2-divided spring guides is substantially the same as the inner diameter of the first turn of the torsion spring, when the rotary plate rotates, the first turn of the spring on the plate side is rotated being wound around the spring guide. Therefore, the spring is prevented from deformation and eccentricity in shape, thus resulting in a perfect prevention against the drawbacks such that the efficiency of the coil spring is degraded.

According to the third aspect of the present invention there is provided a 2-4 wheel drive change over apparatus which can solve the afore-mentioned problems by multiplying a charged torque of a rotary type torque accumulating (stand-by) mechanism via a reduction gear.

That is, according to the third aspect of the present invention a 2-4 wheel drive change over apparatus for a 4-wheel drive vehicle provided with a reciprocably movable fork shaft to which a shift fork for moving a 2-4 wheel change over slider to and fro is fixed, the apparatus is characterized in that a worm wheel driven by a motor is provided on an output shaft supported by a casing so as to be rotatable relative to the output shaft; a pair of rotary plates are mounted so as to be rotatable together with the worm wheel; a pair of fixed plates are fixed to an output shaft; a torsion spring is disposed between the rotary plate and the fixed plate; a rotational torque of the worm wheel is transmitted to the output shaft via the torsion spring by retaining both ends of the spring between the rotary plate and the fixed plate; a small-diameter gear is fixed to the output shaft; and there is provided a mechanism such that a rotational force of a large-diameter gear in mesh with the small-diameter gear is transmitted to the fork shaft in the form of reciprocative motion.

When the motor is driven, the worm wheel is driven by a worm; the rotary plate relates; the torsion spring is twisted; and the revolutional torque of the worm wheel is charged in the torsion spring. This totary torque is transmitted to the output shaft via the fixed plate to rotate the output shaft. Once the output shaft rotates, the revolutional speed reduced through the small-diameter gear and the large-diameter gear is transmitted to the counter shaft and then to the fork shaft via a reciprocative movement transmitting mechanism in the form of reciprocative motion to allow the slider to be changed over from 2-wheel drive to 4-wheel drive or vice versa.

According to the third aspect, since the revolutional speed can be reduced through the small-diameter gear and the large-diameter gear on the output shaft, it is possible to reduce the spring force of the torsion spring by the degree corresponding to the reduced speed, thus minimizing the torsion spring in shape.

According to the fourth aspect of the present invention, the afore-mentioned problem is solved by covering the cam switch by a projection.

That is, according to the fourth aspect, in a 4-wheel drive change over apparatus for a 4-wheel drive vehicle provided with a reciprocably movable fork shaft to which a shift fork for moving a 2–4 wheel change over slider to and fro is fixed, the apparatus is characterized in that a worm wheel for applying a rotational torque via a torsion spring to an output shaft for driving the fork shaft is so provided as to be rotated by the motor via the worm gear; a cam switch for detecting an angular position is disposed in the vicinity of the worm wheel; an outer periphery of the cam switch is covered; and a projection portion is provided in contact with the worm wheel for a casing which encloses the worm wheel. The afore-mentioned problems can be solved by the above features.

When the contact of the cam switch is turned on, the motor rotates; the worm gear rotates by the motor shaft to rotate the worm wheel. In operation, since the worm gear rotates at high speed, grease applied on the worm gear is scattered about. However, since the outer periphery of the cam switch is covered with the projection portion, no grease is scattered away and stuck onto the other elements.

According to the fourth aspect of the present invention, since the projection portion which covers the outer periphery of the cam switch is disposed at the lower part of the worm wheel, even if grease applied to the worm gear is scatted away when the worm gear is rotating at high speed, the cam switch is protected from grease, thus preventing erroneous operation due to malfunction of switch contacts.

DETAILED DESCRIPTION OF THE PREFERRED EMBODIMENTS

The present invention will be described hereinbelow on the basis of the embodiments shown in the drawings. FIGS. 1 to 6 show an embodiment thereof, in which the numeral 1 denotes an output shaft of a transmission through which a driving power is transmitted from an engine. This output shaft 1 is a front or rear wheel drive shaft which rotates all the time (2 wheel drive). Further an output shaft 3 (rear or front wheel drive shaft) is supported by the output shaft 1 via a bearing 2. When a slider 5 in engagement with a spline 4 of the output shaft 1 is moved rightward by a shift fork 6 to couple two splines 4 and 7, the two output shafts 3 and 1 are coupled to each other into 4-wheel drive.

Figure 3:
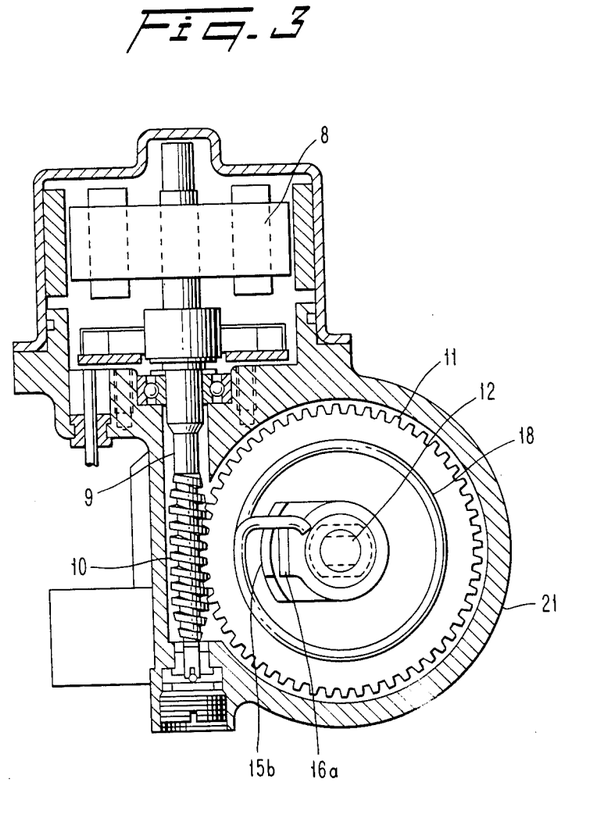
FIG. 3 is a cross-sectional view taken along the line III—III in FIG. 2.

The numeral 8 denotes a drive motor; 9 denotes a motor shaft; 10 denotes a worm gear fixed to the motor shaft 9 and driven at a high speed (vid. FIG. 3). The worm gear 10 is in mesh with a worm wheel 11. The worm wheel 11 is rotatably supported by an output shaft 12 via a sleeve 13. Further, on the output shaft 12, two rotary plates 15a and 15b formed integral via a coupling sleeve 14 are provided so as to be rotatable together with the worm wheel 11. Further, two fixed plates 16a and 16b for transmitting a rotational force are fixed to the output shaft 12. Two-divided spring guides 17a and 17b are provided between the rotary plates 15a and 15b. On the two guides 17a and 17b, a torsion spring 18 is mounted in such a way that both the extreme end turns thereof are retained between the two guides with a predetermined clearance kept away from the guides 17a, 17b at the middle portion of the spring. Both the ends 19a and 19b of the spring 18 are retained between the rotary plate 15a and the fixed plate 16a and between the rotary plate 15b and the fixed plate 16b, respectively, along the respective rotational direction. A stopper 20 is formed integral with the worm wheel 11, and a projection (not shown) is provided for the casing 21 so as to be brought into contact with the stopper 20 after the stopper 20 has been rotated through a predetermined angle.

Further, the worm wheel 11 is formed with a copper contact plate 22 for detecting angular positions, and the casing 21 is provided with a detecting contact. The reference numeral 23 denotes a cam switch; 24 denotes a projection for surrounding the outer periphery of the cam switch 23. A small-diameter gear 25 is fixed to the output shaft 12, while a large-diameter gear 26 in mesh with the gear 25 is fixed to a counter shaft 27. A pinion gear 28 is fixed to the counter shaft 27. An output shaft 29 to which reciprocative motion is transmitted is connected with the pinion gear 28 via a rack (not shown) in mesh with the pinion gear 28. A fork shaft 30 having a slide fork 6 is connected with an output shaft 29.

In more detail, the two-divided spring guides 17a and 17b are provided on a coupling sleeve 14 of the rotary plates 15a and 15b so as to be rotatable relative to each other. The outer diameter of the spring guides 17a and 17b is so formed as to be roughly equal to the inner diameter of the first turn of both the ends of the torsion spring 18.

Each of the rotary plates 15a, 15b and each of the fixed plates 16a, 16b are formed into a cylindrical portion extending outward in axial direction thereof, respectively. By this provision significant reduction in size with further increasing the performance is achieved.

The operation of the embodiment constructed as described above will be described hereinbelow. When the rotary plate 15b is rotated counterclockwise from the state shown in FIG. 3, for instance, the first turn of the end (19b side, FIG. 2) of the coil spring 18 is wound around and fixed to the spring guide 17a, so that the guide 17a is rotated together with the torsion spring 18. On the other hand, when the rotary plate 15b is returned clockwise, the first turn of the end (19a side) of the coil spring 18 is wound around and fixed to the spring guide 17b, so that the guide 17b is rotated together with the torsion spring 18, thus preventing deformation in shape of the spring 18 in torsional operation.

The function of the embodiment constructed as described above will be described hereinbelow. Since the rotary plates 15a and 15b are fixed in parallel to each other by the coupling sleeve 14 so as to be rotatable relative to the output shaft 12, when a rotational torque of the worm wheel 11 is transmitted to the rotary plate 15b (counterclockwise), the torque is transmitted to the plate 16a via the torsion spring 18. Further, when a rotational torque of the worm wheel 11 is transmitted from the rotary plate 15a (clockwise), the torque is transmitted to the plate 16b via the torsion spring 18.

Figure 4:
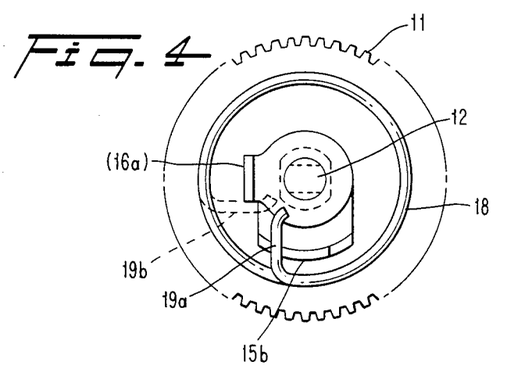
FIGS. 4, 5 and 6 are illustrating views taken like FIG. 3 for assistance in explaining the operation of the rotary plate, respectively.
Figure 5:
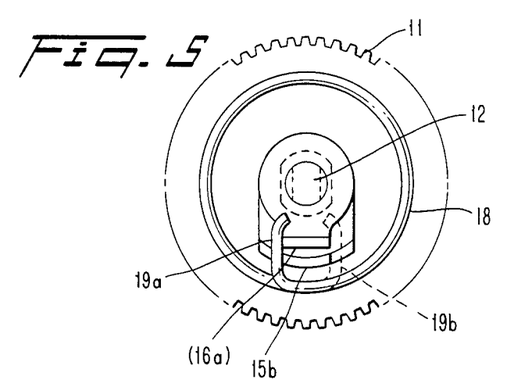
Figure 6:
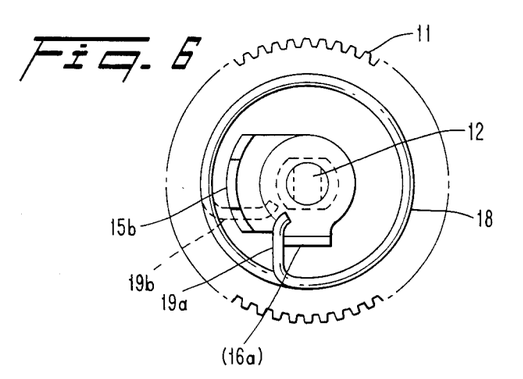

Here, in the case where the fork shaft 30 is inoperative (not slidable) (due to disengagement of teeth of two change over splines), at counterclockwise rotation only the rotary plate 15b rotates to turn off the cam switch 23 after rotation through a predetermined angle, so that the motor stops at a state as shown in FIG. 4, in which the spring 18 is kept biased between the rotary plate 15b and the fixed plate 16a. (N.B. In FIGS. 4-6, "(16a)" denotes the fixed plate disposed at the other side (19b side).)

On the other hand, when the fork shaft 30 becomes operative (slidable), the output shaft 12 rotates due to the biased force of the torsion spring as shown in FIG. 5, so that the output shaft 29 is moved reciprocably via the gears 25, 26 and 28. When the fork shaft 30 is returned (counterclockwise in FIG. 5), the state changes from the one shown in FIG. 6 to the one shown in FIG. 3.

Figure 1:
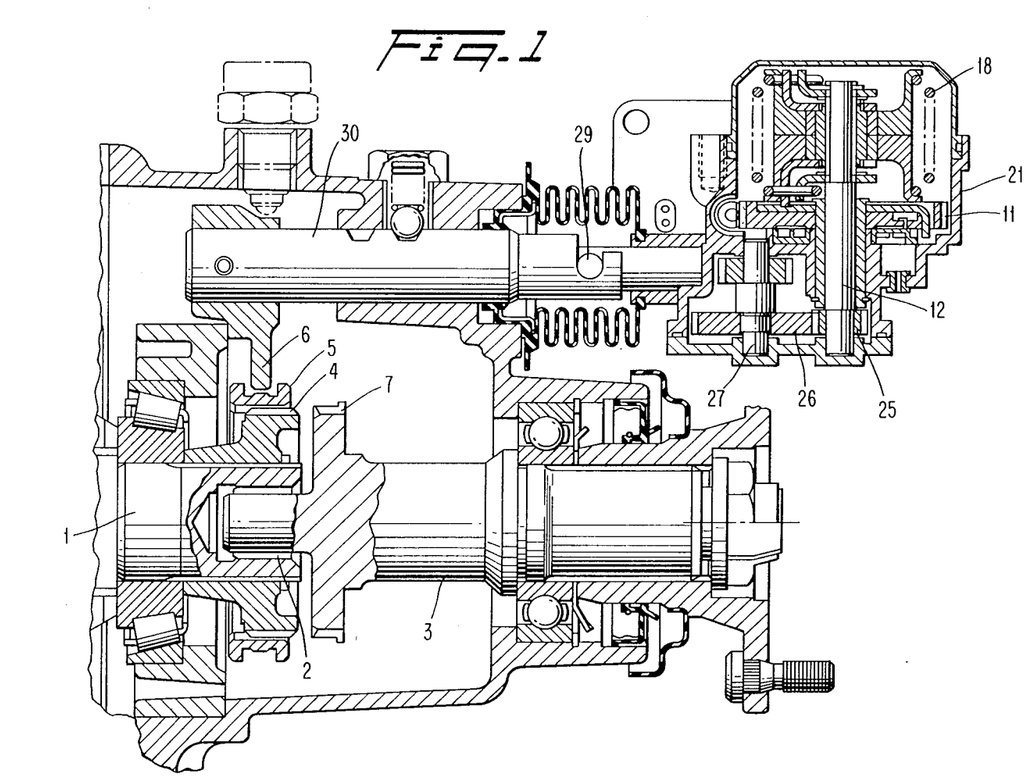
FIG. 1 is a front cross-sectional view of a 2–4 wheel drive change over apparatus showing an embodiment of the present invention.
Figure 2:
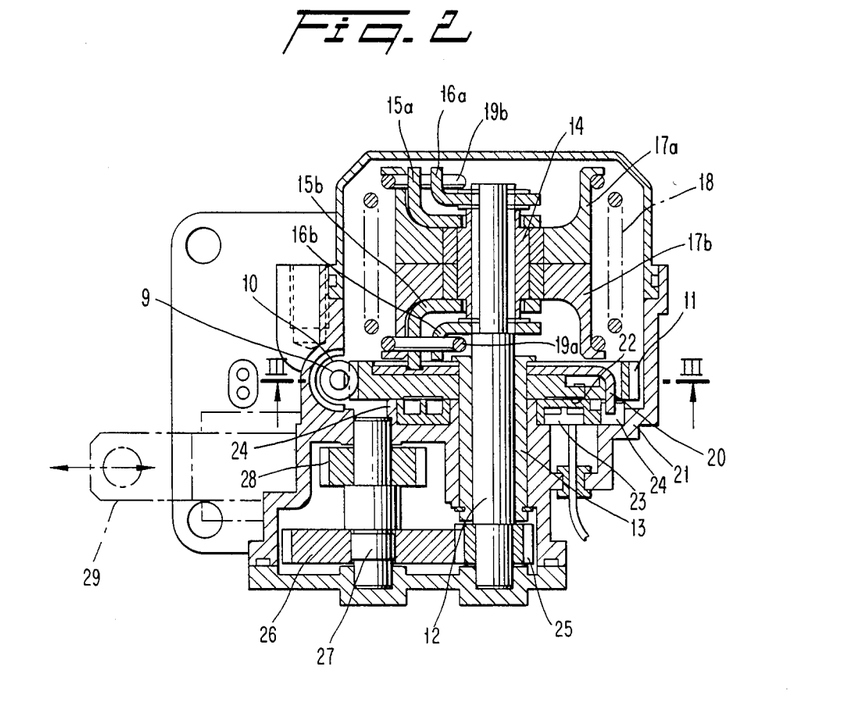
FIG. 2 is an enlarged view showing the essential portion in FIG. 1.

The function of the embodiment constructed as described above will be described from a point of view of the third aspect of the invention. When the drive motor 8 is driven under the condition that the slider 5 is engaged with only the spline 4 as shown in FIG. 1, the worm gear 10 is rotated by the motor shaft 9 to rotate the worm wheel 11. When the worm wheel 11 rotates, since the rotary plate 15a rotates, one end 19b of the torsion spring 18 is twisted, so that a rotational torque of the worm wheel 11 is accumulated in the torsion spring 18. The rotational torque accumulated in the torsion spring 18 is transmitted to the output shaft 12 via the plate 16b fixed to the output shaft 12 to rotate the output shaft 12. Therefore, the large-diameter gear 26 is rotated via the small-diameter gear 25 to rotate the counter shaft 27 at a reduced speed. Further, the rack (not shown) is driven by the pinion gear 28 to shift the output shaft 29, so that the fork shaft 30 is moved in the rightward direction to shift the slider 5 in the rightward direction via the shift fork 6. Therefore, the slider 5 couples the two splines 4 and 7, that is, the output shafts 3 and 1 are coupled into the 4-wheel drive mode. Therefore, it is possible to reduce the spring force of the torsion spring to a degree corresponding to a speed reduced through the small-diameter gear and the large diameter gear on the output shaft, thus reducing the size of the torsion spring by that amount.

The fourth aspect of the present invention will be described in further detail. FIG. 7 is a front view of the cam switch 23 and FIG. 8 is a front view of the contact plate 22. The cam switch 23 is provided with contacts 31, 32 and 33, 34. The contact 31 generates a forward rotation signal to the motor 8; the contact 32 generates a reverse rotation signal to the motor; the contacts 33 and 34 are grounded. Further, the contact plate 22 is implanted in the worm wheel 11 as shown in FIG. 1. The numeral 35 denotes a non-conductive portion formed by cutting out the contact plate 22.

The function will be described from a point of view of the fourth aspect. In the state shown in FIG. 8, since the contact 31 is in contact with the contacts 33 and 34 in the contact plate 22, a forward rotation signal is applied to the motor 8. Therefore, the worm gear 10 is rotated by the motor 8 at a high speed, and thus the worm wheel 11 rotates. When the motor 8 is rotating in the forward direction, the contact plate 22 rotates clockwise in FIG. 8. When the non-conductive portion 35 reaches an angular position 35a, where the contact 31 is open away from the contacts 33 and 34, the motor 8 stops rotating. Under these conditions, however, since a rotational torque is accumulated in the torsion spring 18, the output shaft 12 is rotated. Simultaneously under these conditions, since the contact 32 is closed to the contacts 33 and 34, the motor 8 rotates in the reverse direction to return the worm wheel 11 to the original condition.

According to the fourth aspect of the present invention, since the projection portion is formed under the worm wheel so as to cover the outer periphery of the cam switch, even if grease applied on the worm gear is scattered away when the worm gear for transmitting a rotational force to the worm wheel is rotating at a high speed, no grease is stuck onto the cam switch, thus preventing erroneous operation due to the contacts of the switch.

It is to be understood by those skilled in the art that the foregoing description is of preferred embodiments of the disclosed apparatus and that various changes and modifications may be made in the invention, and equivalents employed, without departing from the spirit and scope thereof.

What is claimed is:

1. A rotary torque transmission apparatus for a four-wheel drive vehicle comprising:
    a two-four wheel drive change over slider for changing the drive of the vehicle between two and four wheel drive;
    a reciprocably movable fork shaft including a shift fork engageable with said change over slider for moving the slider between a two wheel drive position and a four wheel drive position; and
    fork shaft drive means for moving said fork shaft, said fork shaft drive means including a casing, an output shaft rotatably supported in said casing, a motor, a worm wheel rotatably supported on said output shaft and driven by said motor, a pair of fixed plates mounted on said output shaft, a pair of rotary plates rotatable with said worm wheel and positioned axially between said fixed plates along said output shaft, and a torsion spring arranged radially outwardly of said rotary plates and including two ends each retained between one of said rotary plates and one of said fixed plates, whereby the rotary torque of said driven worm wheel is transmitted to said output shaft by said torsion spring.

2. The rotary torque transmission apparatus as set forth in claim 1, wherein said fork shaft drive means further includes a coupling sleeve supporting said rotary plates and a pair of spring guides rotatably supported on said sleeve between said rotary plates, and said torsion spring includes a plurality of turns between the ends, said spring guides each being rotatable relative to the other and including a diameter substantially equal to the inner diameter of the turns of the torsion spring adjacent the ends of the torsion spring.

3. The rotary torque transmission apparatus as set forth in claim 1, wherein said fork shaft drive means further includes a small-diameter gear fixed to said output shaft, a large-diameter gear in mesh with the small-diameter gear, and rotary-to-linear transmitting means for transmitting motion from the large-diameter gear to said fork shaft.

4. The rotary torque transmission apparatus as set forth in claim 1, wherein said fork shaft drive means further includes a cam switch for detecting an angular position of said worm wheel, said cam switch being positioned adjacent a side of the worm wheel and being provided with a cover and a projection portion, said projection portion being in contact with said worm wheel for encasing the cam switch against the worm wheel.

5. The rotary torque transmission apparatus as set forth in claim 4, wherein said cam switch stops the motor and torque power is accumulated in said torsion spring when said worm wheel rotates through a predetermined angle.

6. The rotary torque transmission apparatus as set forth in claim 1, wherein each of said rotary plates and each of said fixed plates are formed with a cylindrical portion extending perpendicular thereto.

7. The rotary torque transmission apparatus as set forth in claim 6, wherein the cylindrical portions of said rotary plates extend radially outwardly over said fixed plates.

8. The rotary torque transmission apparatus as set forth in claim 6, wherein one end of said torsion spring is retained by the cylindrical portion of one of said fixed plates and the other end of the torsion spring is retained by the cylindrical portion of one of said rotary plates.

9. The rotary torque transmission apparatus as set forth in claim 8, wherein the ends of the torsion spring extend in an axial direction of the spring.

10. The rotary torque transmission apparatus as set forth in claim 1, wherein said torsion spring is retained between the pair of fixed plates and the pair of rotary plates to allow torque transmission in one of the rotational directions of the worm wheel.

11. The rotary torque transmission apparatus as set forth in claim 10, wherein both ends of said torsion spring are retained by mutually opposing sides of said pair of fixed plates so as to allow engagement at each one side upon rotation of said torsion spring in one direction.

12. A two-four wheel drive change over apparatus for a four-wheel drive vehicle comprising:
a two-four wheel drive change over slider for changing the drive of the vehicle between two and four wheel drive;
a reciprocably movable fork shaft including a shift fork engageable with said change over slider for moving the slider between a two wheel drive position and a four wheel drive position; and
fork shaft drive means for moving said fork shaft, said fork shaft drive means including an output shaft, a motor, and connecting means for connecting said output shaft with said motor, said connecting means including a coupling sleeve, a pair of rotary plates mounted on said coupling sleeve, a pair of spring guides disposed between said rotary plates on said coupling sleeve and being rotatable relative to one another, and a torsion spring having two ends and a plurality of turns, said spring guides each having a diameter substantially equal to the inner diameter of the turns of the spring adjacent the two ends of the torsion spring, whereby rotary torque of the motor is transmitted to the output shaft through the connecting means.

13. The two-four wheel drive change over apparatus as set forth in claim 12, wherein said spring guides each include a radially extending projection portion which restricts movement of said torsion spring in the direction of said coupling sleeve.

14. The two-four wheel drive change over apparatus as set forth in claim 12, wherein said plurality of turns of said torsion spring include a number of middle turns each having a diameter which is larger than the diameter of the turns adjacent the ends of the torsion spring.

15. A rotary torque transmission apparatus for a four-wheel drive vehicle comprising:
a two-four wheel drive change over slider for changing the drive of the vehicle between two and four wheel drive;
a reciprocably movable fork shaft including a shift fork engageable with said change over slider for moving the slider between a two wheel drive position and a four wheel drive position; and
fork shaft drive means for moving said fork shaft, said fork shaft drive means including a casing, an output shaft rotatably supported in said casing, a motor, a worm wheel rotatably supported on said output shaft and driven by said motor, a pair of fixed plates mounted on said output shaft, a pair of rotary plates rotatable with said worm wheel and positioned axially along said output shaft, a torsion spring including two ends each retained between one of said rotary plates and one of said fixed plates, whereby the rotary torque of said driven worm wheel is transmitted to said output shaft by said torsion spring, said fork shaft drive means further including a small-diameter gear fixed to said output shaft, a large-diameter gear in mesh with said small-diameter gear, and rotary-to-linear transmitting means for transmitting motion from the large-diameter gear to said fork shaft.

* * * * *